United States Patent
Williford et al.

(10) Patent No.: US 11,936,146 B2
(45) Date of Patent: Mar. 19, 2024

(54) FINGER CLUSTER CONNECTOR FOR A RACKABLE CIRCUIT BREAKER CONNECTING WITH A GROUNDING BUS

(71) Applicant: Schneider Electric USA, Inc., Andover, MA (US)

(72) Inventors: Matthew Alan Williford, Nashville, TN (US); Sergio Flores, Smyrna, TN (US); David Price, Murfreesboro, TN (US)

(73) Assignee: Schneider Electric USA, Inc., Boston, MA (US)

( * ) Notice: Subject to any disclaimer, the term of this patent is extended or adjusted under 35 U.S.C. 154(b) by 17 days.

(21) Appl. No.: 17/557,261

(22) Filed: Dec. 21, 2021

(65) Prior Publication Data
US 2022/0209477 A1     Jun. 30, 2022

Related U.S. Application Data

(60) Provisional application No. 63/131,384, filed on Dec. 29, 2020.

(51) Int. Cl.
*H01R 13/115*     (2006.01)
*H01R 13/18*     (2006.01)
(Continued)

(52) U.S. Cl.
CPC ......... *H01R 25/142* (2013.01); *H01R 13/115* (2013.01); *H01R 13/18* (2013.01);
(Continued)

(58) Field of Classification Search
CPC ..... H01R 25/142–13/115; H01R 13/18; H02B 1/052; H02B 1/16; H02B 1/20; H02B 1/21
See application file for complete search history.

(56) References Cited

U.S. PATENT DOCUMENTS 6,512,669 B1   1/2003   Goodwin et al.
8,182,299 B2 *   5/2012   Schrader ............ H01R 13/113
                                                   439/857

(Continued)

FOREIGN PATENT DOCUMENTS

EP         2230735 A1     9/2010
EP         2690637 A1     1/2014
WO     2009100812 A2    8/2009

OTHER PUBLICATIONS

Extended European Search Report dated May 20, 2022 for corresponding European Patent Application No. 21214868.8-1201, 10 pages.

*Primary Examiner* — Vanessa Girardi
(74) *Attorney, Agent, or Firm* — Locke Lord LLP (57) ABSTRACT

A grounding system for a rackable circuit breaker includes a finger cluster connector connected to a grounding bus in the circuit breaker and a rail conductor mounted in a circuit breaker cradle and connected to ground potential. The finger cluster connector includes a conductor formed from a single plate of conductive material folded into a generally U-shaped body with first and second sides divided into a plurality of fingers. Distal ends of the fingers form mutually facing parallel surfaces of a constricted passage configured to make a sliding electrical contact with the rail conductor that is advanced into the constricted passage as the circuit breaker is racked into the cradle. First and second leaf springs fastened to the conductor portion are divided into a plurality of spring finger sections with spring distal ends configured to respectively press against the distal ends of respective fingers of the conductor portion.

12 Claims, 7 Drawing Sheets

(51) Int. Cl.
*H01R 25/14* (2006.01)
*H02B 1/052* (2006.01)
*H02B 1/16* (2006.01)
*H02B 1/20* (2006.01)

(52) U.S. Cl.
CPC ............... *H02B 1/052* (2013.01); *H02B 1/16* (2013.01); *H02B 1/20* (2013.01)

(56) References Cited

U.S. PATENT DOCUMENTS

| | | |
|---|---|---|
| 8,197,289 B1 | 6/2012 | Faber et al. |
| 8,283,585 B2 * | 10/2012 | Capelli ................. H02B 11/28 200/50.23 |
| 9,762,038 B2 | 9/2017 | Schroeder |
| 2010/0311286 A1 | 12/2010 | Schrader |
| 2016/0020052 A1 | 1/2016 | Kaufman |

* cited by examiner

FINGER CLUSTER CONNECTOR FOR A RACKABLE CIRCUIT BREAKER CONNECTING WITH A GROUNDING BUS

CROSS REFERENCE TO RELATED APPLICATIONS

This application claims the benefit of and priority to U.S. Provisional Application No. 63/131,384, filed on Dec. 29, 2020 under 35 U.S.C. 119(e), which application is incorporated by reference herein in its entirety.

TECHNICAL FIELD

The present disclosure relates to connectors for medium voltage electric equipment.

BACKGROUND

Medium voltage circuit breakers used in industrial and commercial applications, may have a rated maximum voltage of, for example, from 5 to 15 kV, a rated continuous current of, for example, from 1200 to 2000 Amperes, and a rated power frequency of, for example, 60 Hz. Medium voltage circuit breakers typically handle three-phase voltage systems and have line and load connectors and ground shoe connectors that are heavy duty electrical connectors.

Racking a circuit breaker in and out of a medium voltage switchgear cabinet may occasionally result in an arc flash, if there are any loose connections, debris, or lost tools left in the breaker compartment cradle. Thus, rackable circuit breakers are designed with the chassis of the breaker connected to a grounding bus that must be connected to a reliable ground connection during the racking operation. The ground connection must a heavy duty connector designed to withstand the high currents attendant to an arc flash event.

Existing designs for such heavy duty connectors typically include multiple pieces (30-40 pieces) comprising fingers and springs, which are costly to assemble. Heavy duty electrical connectors may be required to undergo repeated rack-in and rack-out operations that impose significant insertion and rack-in forces causing wear and tear on the system.

What is needed is a heavy duty electrical connector for medium voltage circuit breakers and other electrical equipment, which is less costly to manufacture, has a lower insertion and rack-in force, reduces wear and tear on the system, can easily handle 1000 rack-in/out operations, and can be applied as a heavy duty connector in a variety of applications.

SUMMARY

In accordance with one example embodiment described herein, a grounding system for a rackable circuit breaker includes a finger cluster connector mounted on a grounding bus in the circuit breaker and a rail conductor mounted in a circuit breaker cradle and connected to ground potential. The finger cluster connector includes a conductor formed from a single plate of conductive material folded into a generally U-shaped body with first and second sides divided into a plurality of fingers. Distal ends of the fingers form mutually facing parallel surfaces of a constricted passage configured to make a sliding electrical contact with the rail conductor when it is advanced into the constricted passage as the circuit breaker is racked into the cradle. First and second leaf springs fastened to the conductor portion are divided into a plurality of spring finger sections with spring distal ends configured to respectively press against the distal ends of respective fingers of the conductor portion. Lead-in alignment surfaces are formed by end finger sections of the conductor configured to align the rail conductor for entry into the constricted passage.

In accordance with one example embodiment described herein, a grounding system for a rackable circuit breaker, comprises:

a finger cluster connector mounted on a grounding bus in a rackable circuit breaker;

a rail conductor mounted in a circuit breaker cradle in a switchgear cabinet and connected to ground potential, wherein the finger cluster connector comprises a conductor portion formed from a single plate of conductive material folded along a principal direction to form a generally U-shaped body having first and second sides, with respective legs of the U-shaped body on the first and second sides having mutually facing parallel surfaces, each of the legs being divided into a plurality of finger sections mutually separated by slots, with distal ends of the finger sections forming the mutually facing parallel surfaces of the legs on the first and second sides separated by a separation distance forming a constricted passage, and an end finger section on one end of each of the first and second sides having mutually facing surfaces on the distal ends of the end finger sections forming lead-in alignment surfaces for the constricted passage, and wherein the lead-in alignment surfaces formed by the end finger sections of the conductor portion are configured to align the rail conductor for entry into the constricted passage as the conductor portion slides along the rail conductor in the principal direction during a rack-in operation of the circuit breaker into the cradle.

In accordance with one example embodiment described herein, wherein the finger cluster connector further comprises:

a first leaf spring fastened to the first side of the conductor portion and divided into a plurality of spring finger sections with spring distal ends configured to respectively press against the distal ends of respective finger sections of the first side of the conductor portion; and a second leaf spring fastened to the second side of the conductor portion and divided into a plurality of spring finger sections with spring distal ends configured to respectively press against the distal ends of respective finger sections of the second side of the conductor portion, wherein the first and second leaf springs press against the distal ends of the finger sections of the first side and second side of the conductor portion to compress the rail conductor to form a good electrical contact within the constricted path, as the conductor portion slides along the rail conductor.

In accordance with one example embodiment described herein, wherein the finger cluster connector further comprises:

the conductor portion formed of a conductive material having a high modulus of elasticity with strong spring properties to enable the distal ends of the finger sections to press against the rail conductor to provide a good electrical contact when the rail conductor is positioned within the constricted passage between the distal ends of the finger sections during a rack-in operation.

In accordance with one example embodiment described herein, a finger cluster connector for sliding electrical connection to a rail conductor, comprises:

a conductor portion formed from a single plate of conductive material folded along a principal direction to form a generally U-shaped body having first and second sides, with respective legs of the U-shaped body on the first and second sides having mutually facing parallel surfaces, each of the legs being divided into a plurality of finger sections mutually separated by slots, with distal ends of the finger sections forming the mutually facing parallel surfaces of the legs on the first and second sides separated by a separation distance forming a constricted passage, and an end finger section on one end of the first and second sides having mutually facing surfaces on the distal ends of the end finger sections forming lead-in alignment surfaces for the constricted passage;

a first leaf spring fastened to the first side of the conductor portion and divided into a plurality of finger sections with distal ends configured to respectively press against the distal ends of respective finger sections of the first side of the conductor portion; and a second leaf spring fastened to the second side of the conductor portion and divided into a plurality of finger sections with distal ends configured to respectively press against the distal ends of respective finger sections of the second side of the conductor portion, wherein the lead-in alignment surfaces formed by the end finger sections of the conductor portion align a rail conductor for entry into the constricted passage and the first and second leaf springs press against the distal ends of the finger sections of the first side and second side of the conductor portion to compress the rail conductor within the constricted path as the conductor portion slides along the rail conductor.

In accordance with one example embodiment described herein, an apparatus, comprising:

a conductor portion formed from a single plate of conductive material folded along a principal direction to form a generally U-shaped body having first and second sides, with respective legs of the U-shaped body on the first and second sides having mutually facing parallel surfaces, each of the legs being divided into a plurality of finger sections mutually separated by slots, with distal ends of the finger sections forming the mutually facing parallel surfaces of the legs on the first and second sides separated by a separation distance forming a constricted passage;

a first leaf spring fastened to the first side of the conductor portion and divided into a plurality of finger sections with distal ends configured to respectively press against the distal ends of respective finger sections of the first side of the conductor portion; and a second leaf spring fastened to the second side of the conductor portion and divided into a plurality of finger sections with distal ends configured to respectively press against the distal ends of respective finger sections of the second side of the conductor portion, wherein the first and second leaf springs press against the distal ends of the finger sections of the first side and second side of the conductor portion to compress an electrical conductor within the constricted path for good electrical contact with the electrical conductor.

In accordance with one example embodiment described herein, wherein the electrical conductor is at least one of a ground conductor, a voltage conductor, or a conductor connected to a load.

The resulting apparatus provides a heavy duty electrical connector for medium voltage circuit breakers and other electrical equipment, which is less costly to manufacture, has a lower insertion and rack-in force, reduces wear and tear on the system, can easily handle 1000 rack-in/out operations, and can be applied as a heavy duty connector in a variety of applications.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
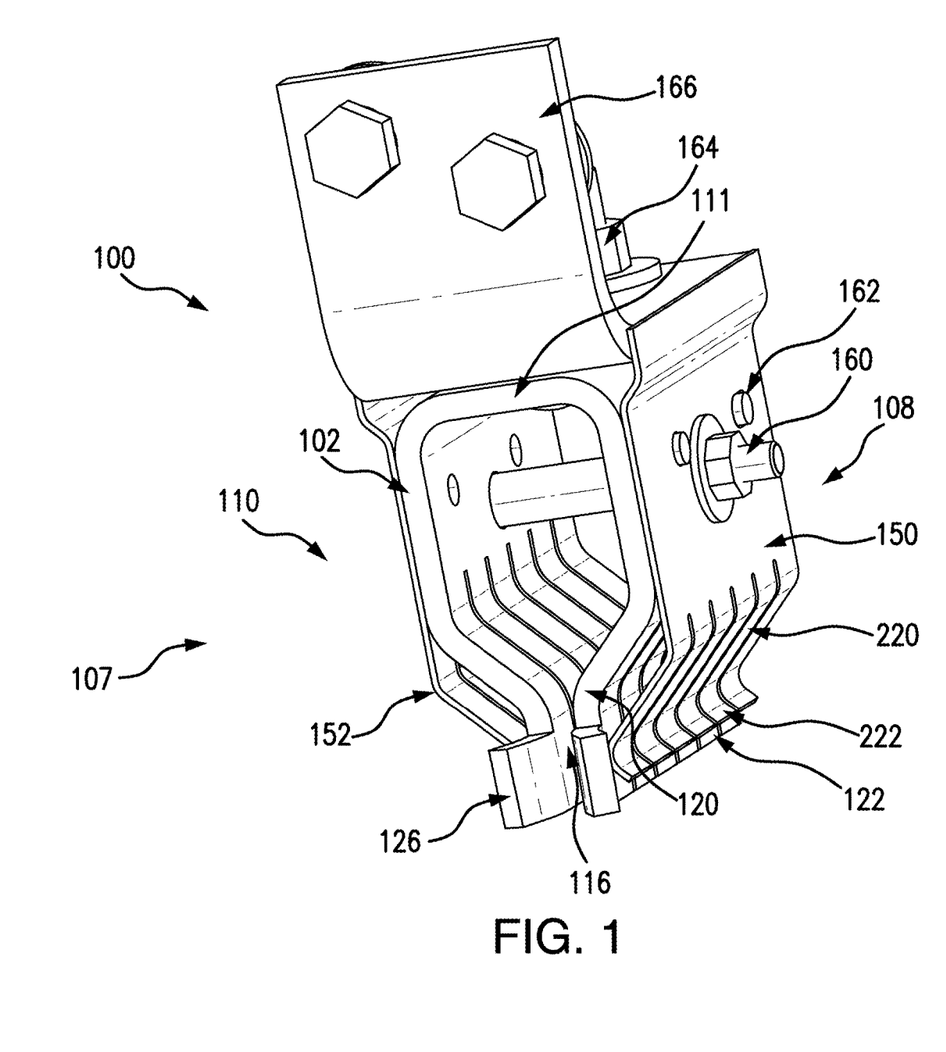
FIG. 1 is a front view of the finger cluster connector in accordance with an embodiment disclosed herein, for mounting in a medium voltage circuit breaker, to enable a reduced rack-in force when racking the breaker into a switch gear cradle.
Figure 3E:
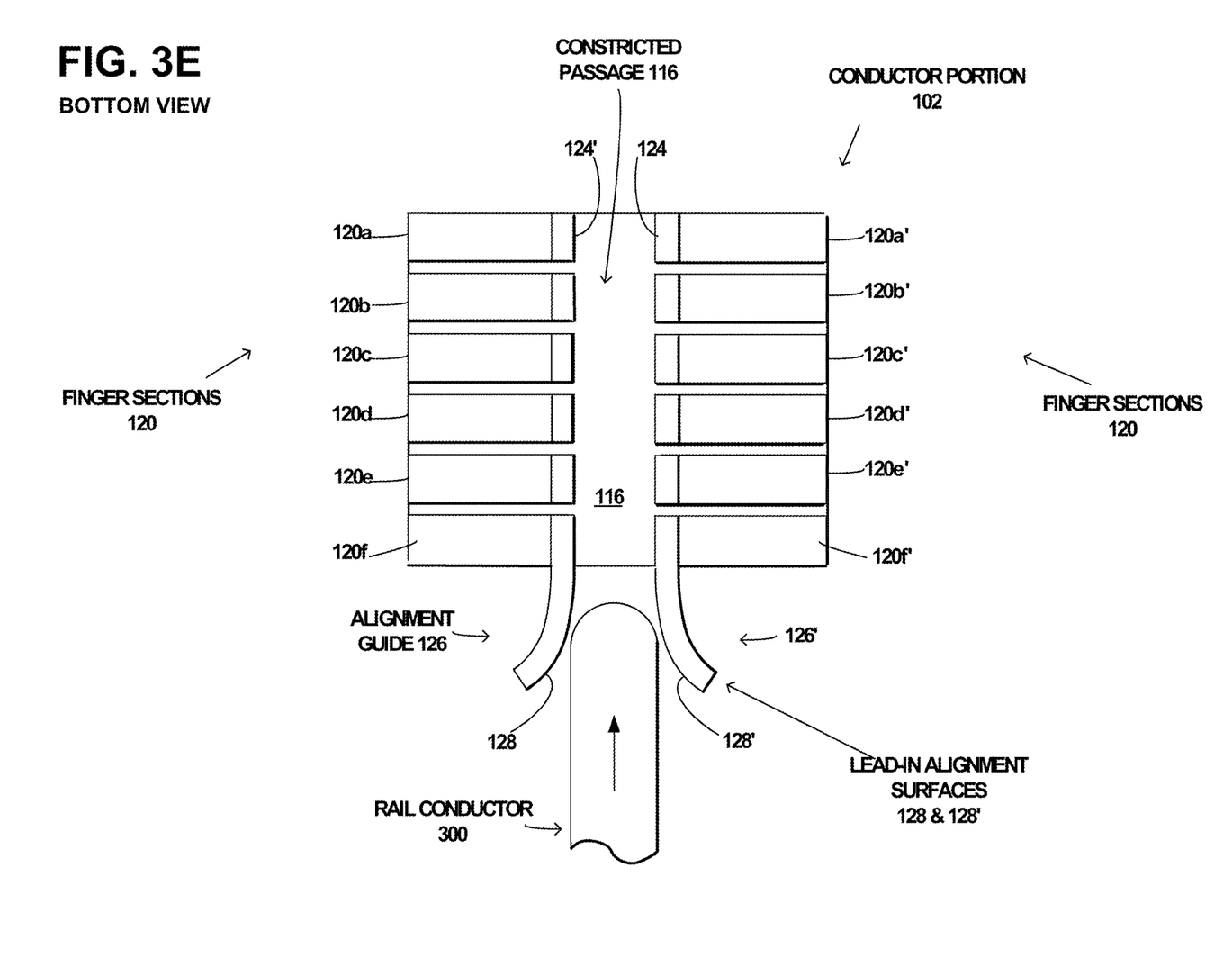
FIG. 3E is a bottom view of the single part finger cluster of FIG. 1, showing the lead-in alignment surfaces for the constricted passage between the distal ends of the finger sections.
Figure 4:
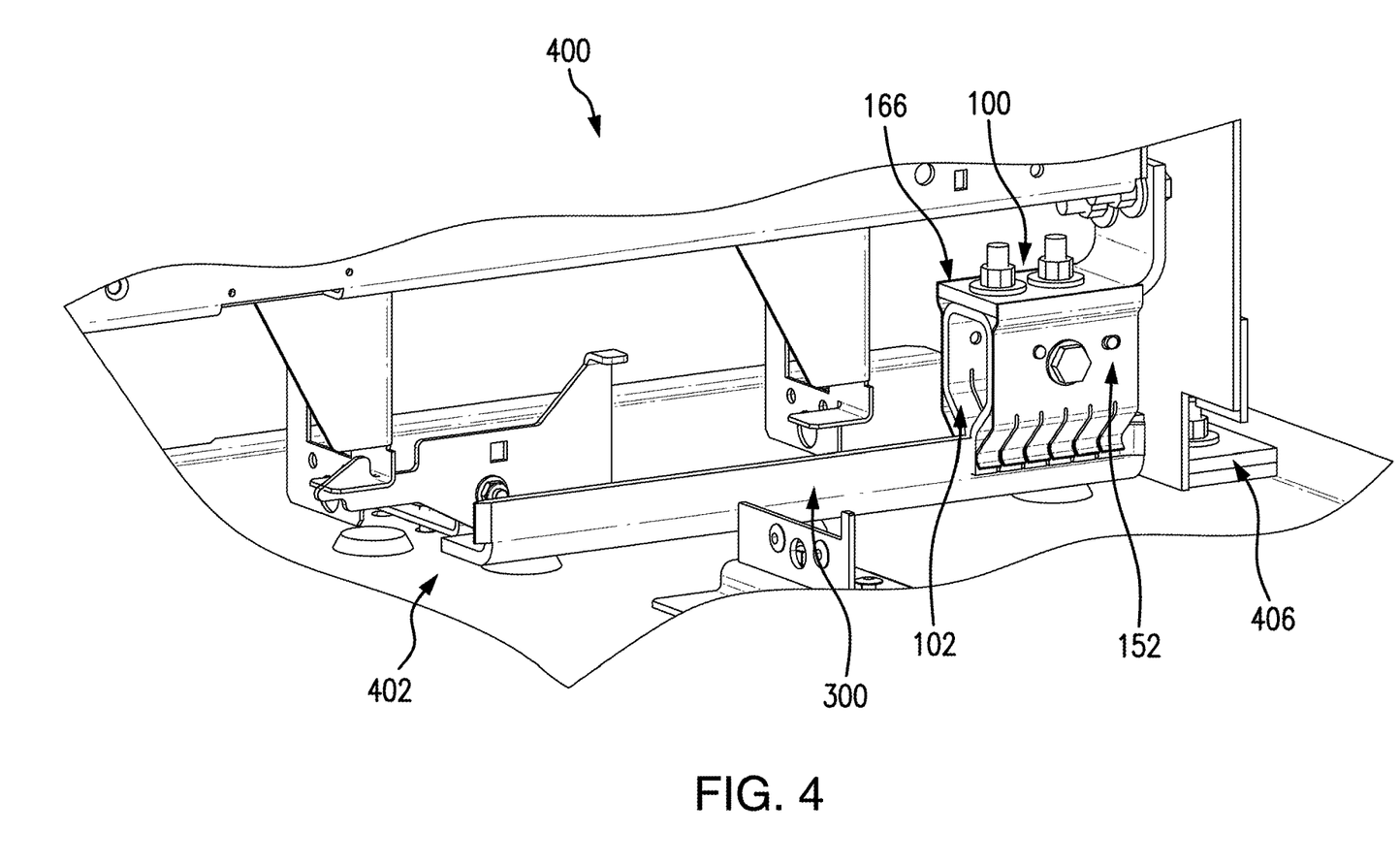
FIG. 4 is a side view of the finger cluster connector of FIG. 2, showing its position on the underside of the medium voltage circuit breaker, functioning as a grounding shoe that slides along the grounded rail conductor mounted in a cradle beneath the circuit breaker. When the breaker racks in, the finger cluster connector mounted to it, is used as the grounding system for the breaker and for grounding test devices.

FIG. 1 is a front view of the finger cluster connector 100 in accordance with an embodiment disclosed herein, for mounting in a medium voltage circuit breaker 400 (FIG. 4), to enable a reduced rack-in force when racking the breaker into a switch gear cradle 402 (FIG. 4). The top 111 of the finger cluster connector 100 is mounted beneath the circuit breaker 400 by means of two bolts 164 and bracket 166 that is part of the grounding bus of the circuit breaker 400. The finger cluster connector 100 is aligned with a rail conductor 300 (FIGS. 3E and 4) mounted in a cradle compartment 402 of a switchgear cabinet, the rail conductor being connected to ground potential 406. The finger cluster connector 100 is aligned with the rail conductor 300 by means of lead-in alignment surfaces 128, 128' of an alignment guide 126, 126' (FIG. 3E) on the finger cluster connector 100, which provides a low force entry as the finger cluster connector 100 moves onto the rail conductor 300. The finger cluster connector 100 then forms a sliding electrical and mechanical connection to the rail conductor 300 as it moves during the rack-in operation. The cluster connector 100 comprises a conductor portion 102, and left and right leaf springs 150 and 152 fastened by means of the bolt 160 and fasteners 162 to the conductor portion 102.

Figure 2:
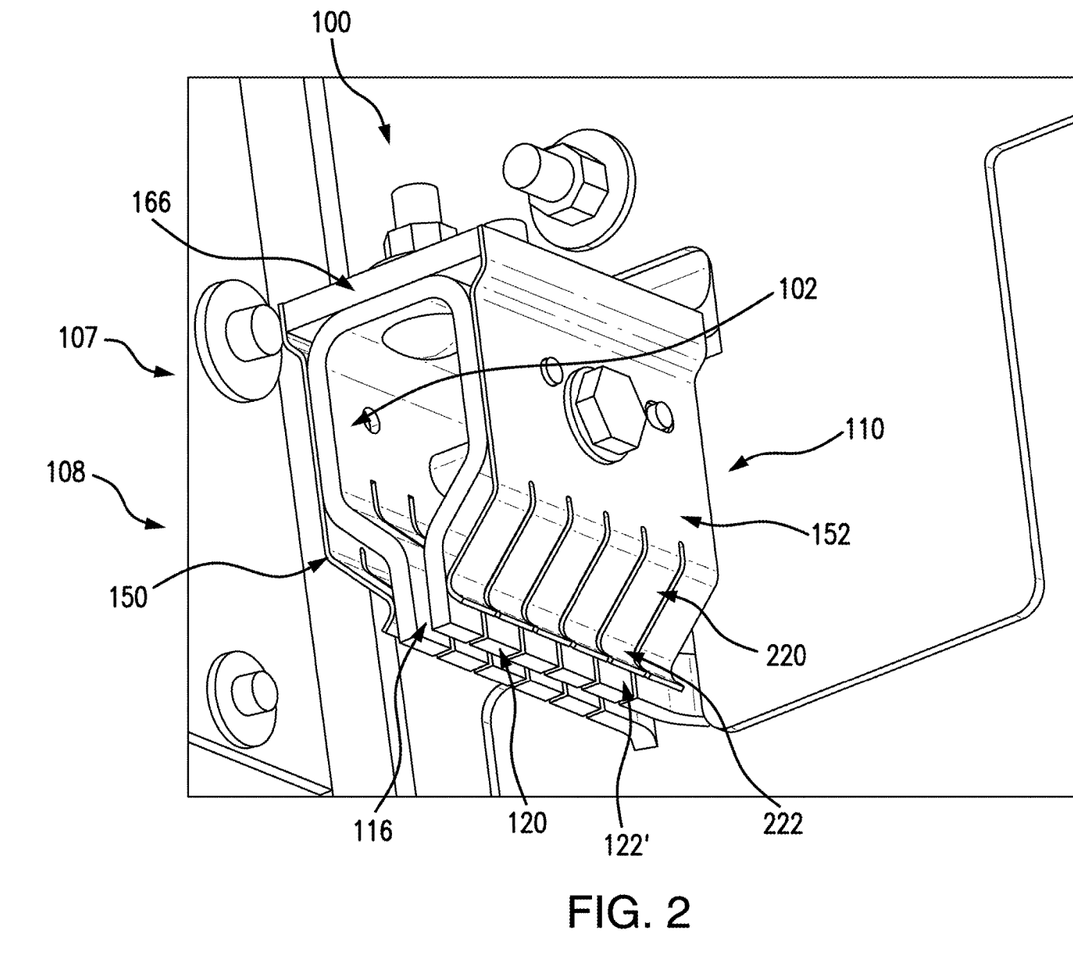
FIG. 2 is a back view of the finger cluster connector of FIG. 1, showing its mounting on the underside of a medium voltage circuit breaker. The cluster connector comprises the conductor portion, and left and right leaf springs fastened by means of the bolt and fasteners to the conductor portion.
Figure 3A:
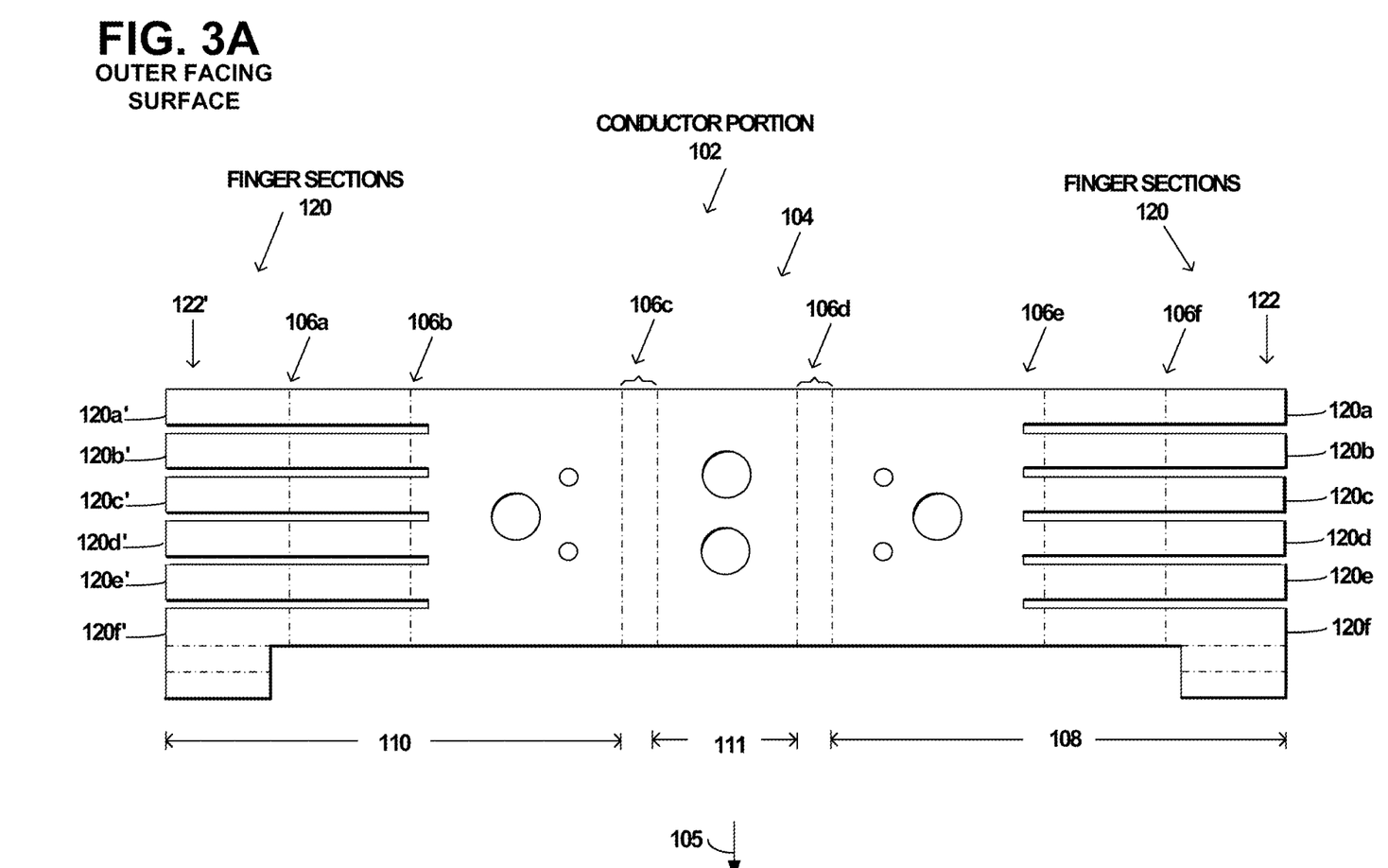
FIG. 3A is a plan view of the outer facing surface of the single plate before it is bent into the shape of the generally U-shaped body of FIG. 1, showing position of the slots separating the fingers in the finger cluster.
Figure 3B:
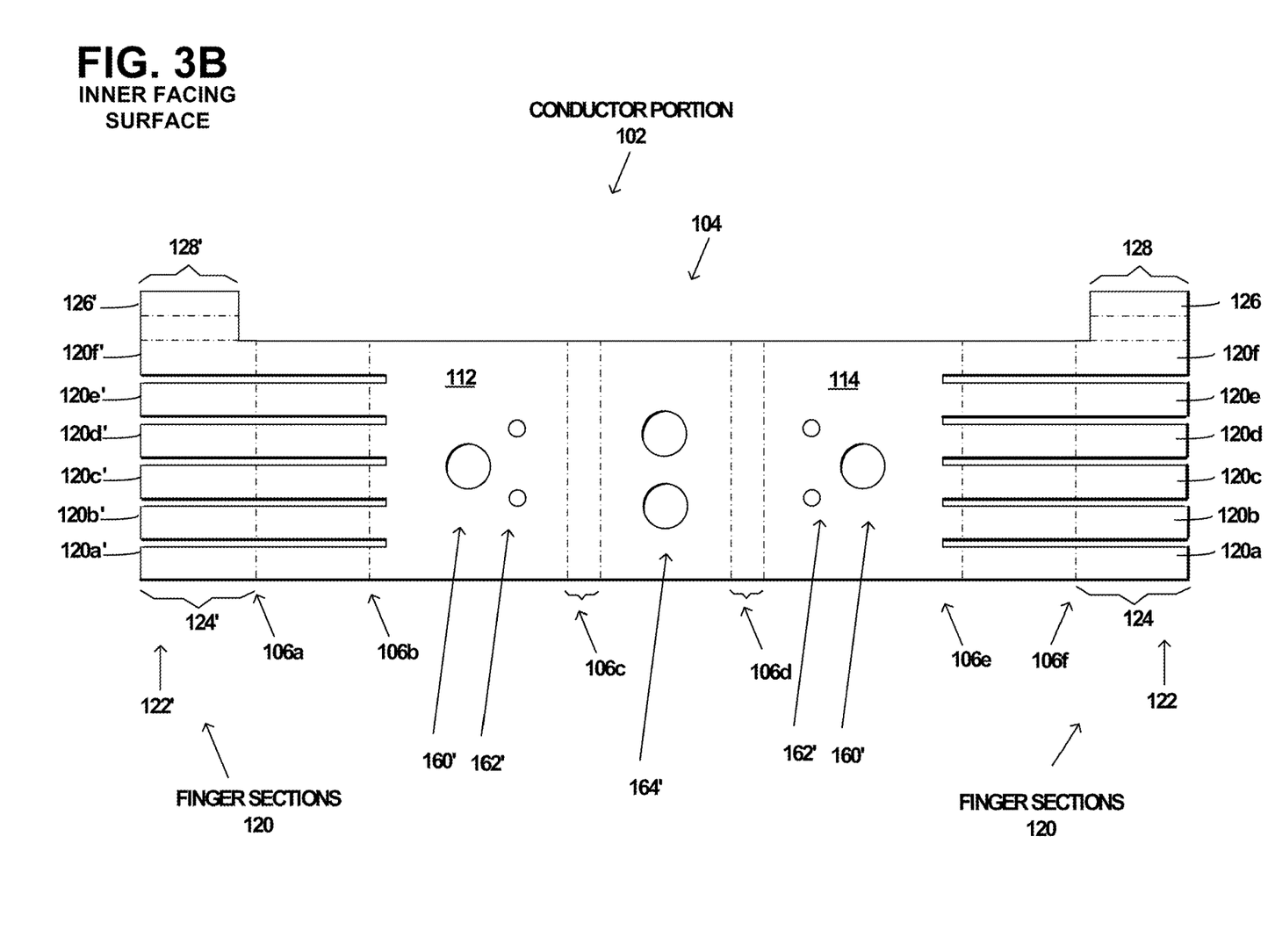
FIG. 3B is a plan view of the inner facing surface of the single plate before it is bent into the shape of the generally U-shaped body of FIG. 1, showing position of the slots separating the fingers in the finger cluster.
Figure 3C:
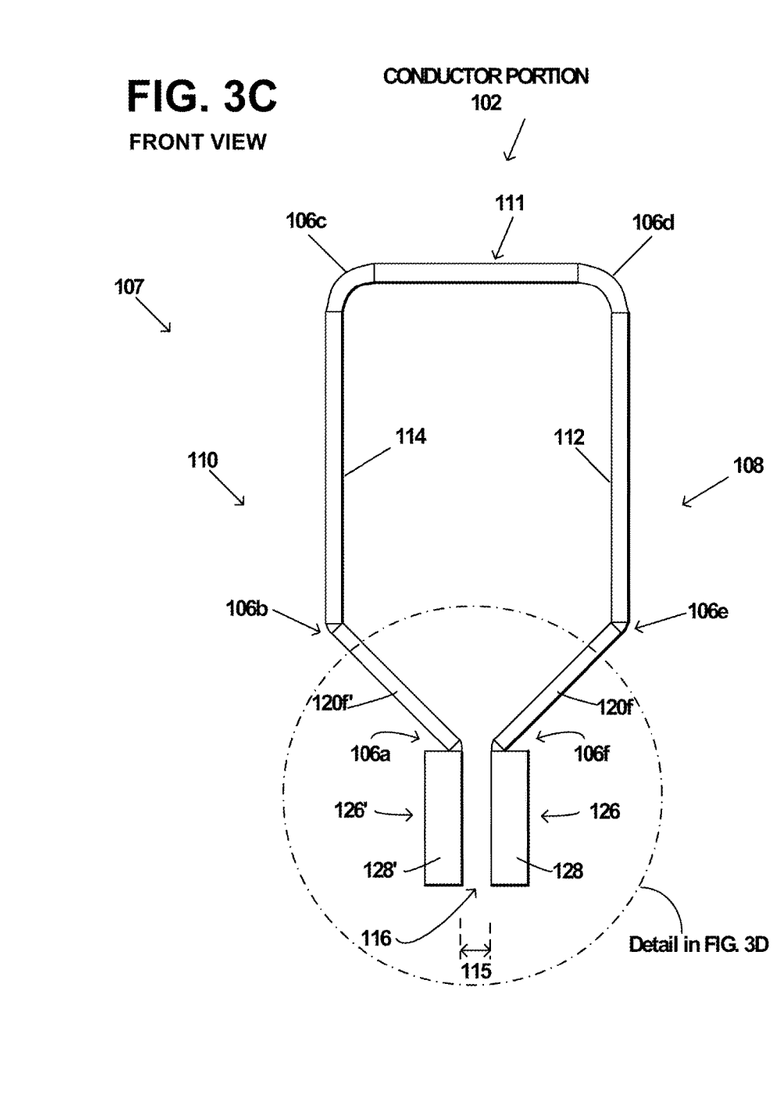
FIG. 3C is a front view of the single plate of FIG. 3B after it has been bent into the generally U-shaped body of the single part finger cluster of FIG. 1, showing the lead-in alignment surfaces for the constricted passage between the distal ends of the finger sections.

The conductor portion 102 is formed from a single plate 104 (FIGS. 3A and 3B) of conductive material, such as an alloy of copper or brass. The single plate 104 is folded along a principal direction 105 at example fold lines 106a, 106b, 106c, 106d, 106e, and 106f (FIGS. 3A and 3B) to form a generally U-shaped body 107 (FIGS. 1, 2, and 3C). The principal direction 105 will be the direction of motion of the circuit breaker 400 during the rack-in operation. The U-shaped body 107 has a first side or leg 108 and a second side or leg 110, with the respective legs of the U-shaped body having mutually facing parallel surfaces 112 and 114 (FIGS. 3B and 3C). Each of the legs 108 and 110 is divided into a plurality of finger sections 120 that are mutually separated by slots. The first side or leg 108 is divided into a plurality of finger sections 120a, 120b, 120c, 120d, 120e, and 120f, which are mutually separated by slots (FIG. 3A). The second side or leg 110 is divided into a plurality of finger sections 120a', 120b', 120c', 120d', 120e', and 120f', which are mutually separated by slots (FIG. 3A).

Figure 3D:
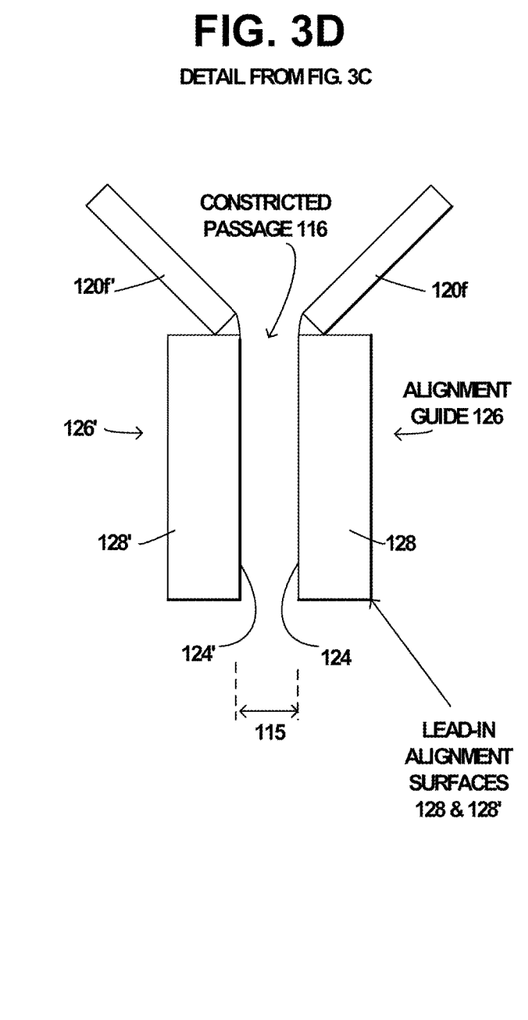
FIG. 3D is an enlarged view taken from FIG. 3C, showing the mutually facing parallel surfaces of the distal ends of the finger sections separated by a separation distance forming the constricted passage.

The distal ends 122 and 122' of the finger sections 120 form mutually facing parallel surfaces 124 and 124' (FIGS. 3B, 3D, and 3E) of the legs 108 and 110 on the first and second sides, which are separated by a separation distance 115 forming a constricted passage 116 (FIGS. 3C and 3D). The mutually facing parallel surfaces 124 and 124' of the finger sections 120 form the electrical and mechanical contacts with the rail conductor 300. The separation distance 115 between the mutually facing parallel surfaces 124 and 124' is set to be slightly less than the corresponding width of the rail conductor 300. A fine adjustment in the setting of the separation distance 115 may be made with the bolt 160 and/or shims. The use of finger clusters in the electrical connector 100 insures that a good, low resistance contact is made with the mating rail conductor 300, which may have an uneven surface with which to make contact. The distal ends 122 and 122' of the finger sections 120 are pressed by leaf springs 150 and 152 (FIGS. 1 and 2) against the rail conductor 300, ensuring good electrical contact when the rail conductor 300 is positioned within the constricted passage between the distal ends 122 and 122' of the finger sections 120 during a rack-in operation.

The first leaf spring 150 is fastened by the bolt 160 and the fastener 162 to the first side or leg 108 of the conductor portion 102 (FIG. 1). The first leaf spring 150 is divided into a plurality of spring finger sections 220 with spring distal ends 222 configured to respectively press against the conductor distal ends 122 of the respective conductor fingers 120a, 120b, 120c, 120d, 120e, and 120f on the first leg 108.

The second leaf spring 152 is fastened by the bolt 160 and a fastener to the second side or leg 110 of the conductor portion 102 (FIG. 2). The first second spring 152 is divided into a plurality of spring finger sections 220 with spring distal ends 222 configured to respectively press against the conductor distal ends 122' of the respective conductor fingers 120a', 120b', 120c', 120d', 120e', and 120f' on the second leg 110 of the conductor portion 102.

The first and second leaf springs 150 and 152 are formed of a conductive material, such as spring steel, having a high modulus of elasticity with good spring properties. The first and second leaf springs 150 and 152 have sufficiently strong spring properties to press the distal ends 122 and 122' of the finger sections 120 of the conductor portion 102 against the rail conductor 300 with sufficient spring force to ensure good electrical contact when the rail conductor 300 is positioned within the constricted passage 116.

Good electrical contact with the rail conductor 300 is made by the conductor distal ends 122 and 122' of the conductor finger sections 120 that are being pressed by the spring distal ends 222 of the leaf springs 150 and 152 (FIGS. 1 and 2) against the rail conductor 300 during the rack-in operation. Each of the conductor distal ends 122 and 122' press against the rail conductor 300 and provide parallel current paths.

The conductor fingers 120f and 120f' on one end of the first 108 and second 110 sides or legs has the alignment guide 126, 126' with mutually facing surfaces 128, 128' (FIGS. 3C, 3D, and 3E) on the distal ends 122 and 122' of the conductor fingers 120f and 120f'. The alignment guide 126, 126' forms the lead-in alignment surfaces 128, 128' for entry of the rail conductor 300 into the constricted passage 116 (FIG. 3E) as the rack-in operation proceeds.

In alternate embodiments, the cluster connector 100 may comprise the conductor portion 102 without the left and right leaf springs 150 and 152, by forming the conductor portion 102 of a conductive material having a higher modulus of elasticity with good spring properties. A conductor portion 102 with sufficiently strong spring properties enables the distal ends 122 and 122' of the finger sections 120 to press against the rail conductor 300 with sufficient force, without the need of the leaf springs 150 and 152. An alloy of copper, such as beryllium copper, has good conductivity and provides sufficient spring force to ensure good electrical contact when the rail conductor 300 is positioned within the constricted passage between the distal ends 122 and 122' of the finger sections 120 during a rack-in operation. Each of the distal ends 122 and 122' press against the rail conductor 300 and provide parallel current paths.

In alternate embodiments, the cluster connector 100 may make connection with a rail conductor 300 connected to at least one of a ground conductor, a voltage conductor, or a conductor connected to a load. In a medium voltage circuit breaker, the cluster connector 100 may be used for connections to the line voltage bus or the load bus of the system, as well to ground potential.

FIG. 2 is a back view of the finger cluster connector 100 of FIG. 1, showing its mounting on the underside of a medium voltage circuit breaker. The cluster connector 100 comprises the conductor portion 102, and left and right leaf springs 150 and 152 fastened by means of the bolt 160 and fasteners 162 to the conductor portion 102.

FIG. 3A is a plan view of the outer facing surface of the single plate 104 before it is bent into the shape of the generally U-shaped body 107 of FIG. 1, showing position of the slots separating the fingers 120 in the finger cluster.

FIG. 3B is a plan view of the inner facing surface of the single plate before it is bent into the shape of the generally U-shaped body 107 of FIG. 1, showing position of the slots separating the fingers 120 in the finger cluster.

FIG. 3C is a front view of the single plate of FIG. 3B after it has been bent into the generally U-shaped body of the single part finger cluster of FIG. 1, showing the lead-in alignment surfaces 128, 128' for the constricted passage 116 between the distal ends of the finger sections 120.

FIG. 3D is an enlarged view taken from FIG. 3C, showing the mutually facing parallel surfaces of the distal ends of the finger sections separated by a separation distance forming the constricted passage.

FIG. 3E is a bottom view of the single part finger cluster of FIG. 1, showing the lead-in alignment surfaces 128, 128' for the constricted passage 116 between the distal ends of the finger sections 120.

FIG. 4 is a side view of the finger cluster connector 100 of FIG. 2, showing its position on the underside of the medium voltage circuit breaker 400, functioning as a grounding shoe that slides along the grounded rail conductor 300 mounted in the cradle 402 beneath the circuit breaker. When the breaker racks in, the finger cluster connector 100 mounted to it, is used as the grounding system for the breaker and for grounding test devices.

The resulting apparatus provides a heavy duty electrical connector for medium voltage circuit breakers and other electrical equipment, which is less costly to manufacture, has a lower insertion and rack-in force, reduces wear and tear on the system, can easily handle 1000 rack-in/out operations, and can be applied as a heavy duty connector in a variety of applications.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A grounding system for a rackable circuit breaker, comprising:
    a finger cluster connector mounted on a grounding bus in a rackable circuit breaker;
    a rail conductor mounted in a circuit breaker cradle in a switchgear cabinet and connected to ground potential,
    wherein the finger cluster connector comprises a conductor portion formed from a single plate of conductive material folded along a principal direction to form a generally U-shaped body having first side and second side, with respective legs of the U-shaped body on the first and second sides having mutually facing parallel surfaces, each of the legs on the first and second sides being divided into a plurality of finger sections mutually separated by slots, each of the plurality of finger sections extending in length in a direction orthogonal to the principal direction, with distal ends of the finger sections forming the mutually facing parallel surfaces of the legs on the first and second sides separated by a separation distance of forming a constricted passage, and an end finger section on one end of each of the first and second sides having mutually facing surfaces on the distal ends of the end finger sections forming lead-in alignment surfaces for the constricted passage, and
    wherein the lead-in alignment surfaces formed by the end finger sections of the conductor portion are configured to align the rail conductor for entry into the constricted passage as the conductor portion slides along the rail conductor in a direction orthogonal to the length of the plurality of finger sections during a rack-in operation of the circuit breaker into the cradle.

2. The grounding system for a rackable circuit breaker of claim 1, wherein the finger cluster connector further comprises:
    a first leaf spring fastened to the first side of the conductor portion and divided into a plurality of spring finger sections with spring distal ends configured to respectively press against the distal ends of respective finger sections of the first side of the conductor portion; and
    a second leaf spring fastened to the second side of the conductor portion and divided into a plurality of spring finger sections with spring distal ends configured to respectively press against the distal ends of respective finger sections of the second side of the conductor portion,
    wherein the first and second leaf springs press against the distal ends of the finger sections of the first side and second side of the conductor portion to compress the rail conductor to form a good electrical contact within the constricted path, as the conductor portion slides along the rail conductor.

3. The grounding system for a rackable circuit breaker of claim 1, wherein the finger cluster connector further comprises:
    the conductor portion formed of a conductive material having a high modulus of elasticity with strong spring properties to enable the distal ends of the finger sections to press against the rail conductor to provide a good electrical contact when the rail conductor is positioned within the constricted passage between the distal ends of the finger sections during a rack-in operation.

4. A finger cluster connector for sliding electrical connection to a rail conductor, comprising:
    a conductor portion formed from a single plate of conductive material folded along a principal direction to form a generally U-shaped body having first and second sides, with respective legs of the U-shaped body on the first and second sides having mutually facing parallel surfaces, each of the legs being divided into a plurality of finger sections mutually separated by slots, each of the plurality of finger sections extending in length in a direction orthogonal to the principal direction, with distal ends of the finger sections forming the mutually facing parallel surfaces of the legs on the first and second sides separated by a separation distance forming a constricted passage, and an end finger section on one end of the first and second sides having mutually facing surfaces on the distal ends of the end finger sections forming lead-in alignment surfaces for the constricted passage;

wherein the lead-in alignment surfaces formed by the end finger sections of the conductor portion align a rail conductor for entry into the constricted passage as the conductor portion slides along the rail conductor in a direction orthogonal to the length of the plurality of finger sections.

5. The finger cluster connector of claim 4, further comprising:
a first leaf spring fastened to the first side of the conductor portion and divided into a plurality of finger sections with distal ends configured to respectively press against the distal ends of respective finger sections of the first side of the conductor portion; and
a second leaf spring fastened to the second side of the conductor portion and divided into a plurality of finger sections with distal ends configured to respectively press against the distal ends of respective finger sections of the second side of the conductor portion,
wherein the first and second leaf springs press against the distal ends of the finger sections of the first side and second side of the conductor portion to compress the rail conductor within the constricted path as the conductor portion slides along the rail conductor.

6. The finger cluster connector of claim 4, wherein the conductor portion is formed of a conductive material having a high modulus of elasticity with strong spring properties to enable the distal ends of the finger sections to press against the rail conductor to provide a good electrical contact when the rail conductor is positioned within the constricted passage between the distal ends of the finger sections.

7. The finger cluster connector of claim 4, wherein the conductor portion is mounted on a grounding bus in a rackable circuit breaker and the rail conductor is mounted in a cradle for racking in the circuit breaker and is connected to ground potential.

8. The finger cluster connector of claim 4, wherein the finger cluster connector makes connection with a rail conductor connected to at least one of a ground conductor, a voltage conductor, or a conductor connected to a load.

9. A finger cluster connector, comprising:
a conductor portion formed from a single plate of conductive material folded along a principal direction to form a generally U-shaped body having first and second sides, with respective legs of the U-shaped body on the first and second sides having mutually facing parallel planar surfaces, each of the legs being divided into a plurality of finger sections mutually separated by slots, with distal ends of the finger sections forming the mutually facing parallel planar surfaces of the legs on the first and second sides separated by a separation distance forming a constricted passage;
a first leaf spring fastened to the first side of the conductor portion and divided into a plurality of finger sections with distal ends configured to respectively press against the distal ends of respective finger sections of the first side of the conductor portion; and
a second leaf spring fastened to the second side of the conductor portion and divided into a plurality of finger sections with distal ends configured to respectively press against the distal ends of respective finger sections of the second side of the conductor portion,
wherein the first and second leaf springs press against the distal ends of the finger sections of the first side and second side of the conductor portion to compress an electrical conductor within the constricted path for good electrical contact with the electrical conductor.

10. The finger cluster connector of claim 9, wherein the connector portion includes an end finger section on one end of the first and second sides having mutually facing surfaces on the distal ends of the end finger sections forming lead-in alignment surfaces for the constricted passage;
wherein the lead-in alignment surfaces formed by the end finger sections of the conductor portion align a rail conductor for entry into the constricted passage as the conductor portion slides along the rail conductor.

11. The finger cluster connector of claim 10, wherein the conductor portion is mounted on a grounding bus in a rackable circuit breaker and the rail conductor is mounted in a cradle for racking in the circuit breaker and is connected to ground potential.

12. The finger cluster connector of claim 10, wherein the finger cluster connector makes connection with a rail conductor connected to at least one of a ground conductor, a voltage conductor, or a conductor connected to a load.

* * * * *